(12) United States Patent
Zhu et al.

(10) Patent No.: US 11,134,182 B2
(45) Date of Patent: *Sep. 28, 2021

(54) GIMBAL SYSTEM (71) Applicant: SZ DJI OSMO TECHNOLOGY CO., LTD., Shenzhen (CN)

(72) Inventors: Mingliang Zhu, Shenzhen (CN); Li Zhou, Shenzhen (CN); Yueqiang Lu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,903

(22) Filed: Apr. 1, 2020

(65) Prior Publication Data
US 2020/0228685 A1 Jul. 16, 2020

Related U.S. Application Data (63) Continuation of application No. 16/504,930, filed on Jul. 8, 2019, now Pat. No. 10,616,454, which is a
(Continued)

(51) Int. Cl.
*H04N 5/225* (2006.01)
*H04N 5/232* (2006.01)
(Continued)

(52) U.S. Cl.
CPC ........... *H04N 5/2252* (2013.01); *F16M 11/10* (2013.01); *F16M 11/18* (2013.01);
(Continued)

(58) Field of Classification Search
CPC .... H04N 5/2252; H04N 5/38; H04N 5/23296; H04N 5/2253; H04N 5/2254;
(Continued)

(56) References Cited

U.S. PATENT DOCUMENTS 7,922,401 B2 4/2011 McKay
8,565,105 B2 10/2013 Diab et al.
(Continued)

FOREIGN PATENT DOCUMENTS

CN 101547301 A 9/2009
CN 103051874 A 4/2013
(Continued)

OTHER PUBLICATIONS

The World Intellectual Property Organization (WIPO) International Search Report for PCT/CN2014/078358 dated Nov. 28, 2014 6 pages.

*Primary Examiner* — Lin Ye
*Assistant Examiner* — Chan T Nguyen
(74) *Attorney, Agent, or Firm* — Anova Law Group, PLLC (57) ABSTRACT

A digital video transmitter includes a video converter configured to convert a digital video signal obtained from an imaging device to a serial differential signal, a filter electrically coupled to the video converter through a differential signal transmission line and configured to filter an interference introduced by an electronic adjuster or a motor, and an image transmitter electrically coupled to the filter and configured to receive and transmit the serial differential signal.

20 Claims, 4 Drawing Sheets

Related U.S. Application Data continuation of application No. 15/358,691, filed on Nov. 22, 2016, now Pat. No. 10,356,290, which is a continuation of application No. PCT/CN2014/078358, filed on May 25, 2014.

(51) Int. Cl.
| | | |
|---|---|---|
| *F16M 11/10* | (2006.01) | |
| *F16M 11/18* | (2006.01) | |
| *F16M 11/20* | (2006.01) | |
| *F16M 13/02* | (2006.01) | |
| *H04N 5/38* | (2006.01) | |

(52) U.S. Cl.
CPC ........ *F16M 11/2071* (2013.01); *F16M 13/02* (2013.01); *H04N 5/2251* (2013.01); *H04N 5/2253* (2013.01); *H04N 5/232* (2013.01); *H04N 5/23296* (2013.01); *H04N 5/38* (2013.01); *F16M 2200/041* (2013.01); *F16M 2200/045* (2013.01)

(58) Field of Classification Search
CPC .... H04N 5/232; F16M 11/2071; F16M 13/02; F16M 11/10; F16M 11/18; F16M 2200/041; F16M 2200/045
USPC .................................................. 348/373–375
See application file for complete search history.

(56) References Cited

U.S. PATENT DOCUMENTS

| | | | |
|---|---|---|---|
| 8,730,130 B1* | 5/2014 | Pray | ........................ G03B 43/00 345/8 |
| 9,144,184 B1 | 9/2015 | Hsieh | |
| 2010/0080111 A1 | 4/2010 | Diab et al. | |
| 2010/0254696 A1 | 10/2010 | McKay | |
| 2011/0302334 A1* | 12/2011 | Ponnatota | ......... H04L 12/40136 710/30 |
| 2013/0167226 A1 | 6/2013 | Lin | |
| 2014/0019302 A1 | 1/2014 | Meadow et al. | |
| 2014/0267778 A1* | 9/2014 | Webb | .................. H04N 5/2328 348/169 |

FOREIGN PATENT DOCUMENTS

| | | |
|---|---|---|
| CN | 203601575 U | 5/2014 |
| CN | 203859813 U | 10/2014 |

\* cited by examiner

GIMBAL SYSTEM

CROSS-REFERENCE TO RELATED APPLICATIONS

This application is a continuation of application Ser. No. 16/504,930, filed on Jul. 8, 2019, which is a continuation of application Ser. No. 15/358,691, filed on Nov. 22, 2016, now U.S. Pat. No. 10,356,290, which is a continuation application of International Application No. PCT/CN2014/078358, filed on May 25, 2014, the entire contents of all of which are incorporated herein by reference.

TECHNICAL FIELD

The disclosure relates to a gimbal system.

BACKGROUND

Video images may be categorized into analog videos and digital videos. An analog video signal may be transmitted uni-directionally without a bidirectional handshake mechanism, and such relatively simple transmission may have a lower requirement on the reliability of a system. However, the analog video signal being transmitted may be susceptible to interference, thus leading to image interfering phenomena such as "a water ripple", "a white spot" and the like on an image received by a receiver of an image transmission device. The quality of an image which can be transmitted by the analog signal may be low, leading to a blurred picture and a low quality in the image received by the receiver of the image transmission device.

An image video of digital video transmission may be clear with a high image quality. However, the high-definition digital video transmission may impose a high requirement on system. The video may not be transmitted unless a handshake between devices is successful, and the transmission may proceed if a continuous handshake signal is seen throughout the transmission to acknowledge a successful communication between devices on both ends. An interference from a gimbal motor, a defect in a material of wires and poor connectivity of a structure may all lead to interruption of video transmission.

An aerial gimbal may be complex in structure and low in system reliability. Therefore, a transmission of high-definition digital video in aerial gimbal system may not be possible in prior art.

SUMMARY

An object of the disclosure is to provide a gimbal system which can stably transmit a high-definition digital video.

According to one aspect of the disclosure, there is provided a gimbal system including an angle adjusting unit configured to carry an imaging device, a main controller configured to detect posture information of the imaging device, a gimbal control unit configured to control the angle adjusting unit according to the posture information, and a digital video transmission component configured to transmit a digital video signal from the imaging device. The digital video transmission component includes a video converter configured to receive the digital video signal and convert and compression encode the digital video signal to output a serial differential signal, a differential signal transmission line coupled to the video converter and configured to transmit the serial differential signal, and an image transmission unit coupled to the differential signal transmission line and configured to receive the serial differential signal transmitted over the differential signal transmission line.

In some embodiments, the digital video signal includes an HDMI signal.

In some embodiments, the serial differential signal includes a USB differential signal, and the differential signal transmission line includes a shielded twisted-pair including a communication bus, a USB+ line, and a USB− line.

In some embodiments, the differential signal transmission line includes an optical fiber or a flexible circuit board.

In some embodiments, the digital video transmission component further includes a data line electrically coupled to the video converter and configured to receive the digital video signal from the imaging device and transmit the digital video signal to the video converter.

In some embodiments, the gimbal system further includes a filter electrically coupled to the video converter via the differential signal transmission line and a transmission circuit electrically coupled between the filter and the image transmission unit. The angle adjusting unit is further configured to adjust a pitch angle of the imaging device.

In some embodiments, the angle adjusting unit includes a cable, a pitch electronic adjuster electrically coupled to the filter via the cable, and a motor electrically coupled to the pitch electronic adjuster. The pitch electronic adjuster is configured to control a rotation speed of the motor to adjust the pitch angle of the imaging device.

In some embodiments, the angle adjusting unit further includes a carrier configured to carry the imaging device and a shaft. The carrier is movably coupled to the shaft through a rotating shaft of the motor. The video converter and the main controller are arranged on the carrier. The differential signal transmission line is arranged in the carrier. The filter is arranged within the shaft.

In some embodiments, the angle adjusting unit is a first angle adjusting unit, the cable is a first cable, the motor is a first motor, the filter is a first filter, and the differential signal transmission line is a first differential signal transmission line. The gimbal system further includes a second filter electrically coupled to the transmission circuit, a second differential signal transmission line electrically coupled between the first filter and the second filter, and a second angle adjusting unit electrically coupled to the second filter. The second angle adjusting unit includes a second cable electrically coupled to the second filter, a roll electronic adjuster electrically coupled to the second filter via the second cable, and a second motor electrically coupled to the roll electronic adjuster. The roll electronic adjuster is configured to control a rotation speed of the second motor to adjust a roll angle of the imaging device.

In some embodiments, the shaft is a first shaft and the second angle adjusting unit further includes a second shaft. The second motor and the roll electronic adjuster are arranged within the second shaft. The second shaft is movably coupled to the first shaft through a rotating shaft of the second motor.

In some embodiments, the gimbal system further includes a third differential signal transmission line electrically coupled between the gimbal control unit and the image transmission unit, and a third angle adjusting unit. The third angle adjusting unit includes a third cable electrically coupled to the gimbal control unit, a yaw electronic adjuster electrically coupled to the gimbal control unit via the third cable, and a third motor electrically coupled to the yaw electronic adjuster. The yaw electronic adjuster is configured to control a rotation speed of the third motor to adjust a yaw angle of the imaging device.

In some embodiments, the gimbal control unit includes a third filter integrated therein.

In some embodiments, the transmission circuit includes an electrical slip ring including a ring and a plurality of needle seats coupled to the ring. The plurality of needle seats includes a communication bus pin, a USB+ pin, and a USB− pin, and are electrically coupled to the gimbal control unit through a flexible circuit board.

In some embodiments, the gimbal system further includes a holder including a top surface and a bottom surface opposite to each other. The third angle adjusting unit is pivotally connected to the holder. The third motor and the transmission circuit are arranged on the top surface and the bottom surface of the holder, respectively. A rotating shaft of the third motor is pivotally connected with the ring of the transmission circuit. The ring of the transmission circuit is configured to rotate synchronously with the rotating shaft of the third motor when the third motor adjusts the yaw angle of the imaging device.

In some embodiments, both the gimbal control unit and the image transmission unit are arranged on the top surface of the holder.

In some embodiments, the third differential signal transmission line includes a communication bus, a USB+ line, and a USB− line.

In some embodiments, the second differential signal transmission line includes a communication bus, a USB+ line, and a USB− line.

As compared with the existing technologies, the video converter of present disclosure may receive a HDMI, AV, SDI or Ycbcr video signal taken by the imaging device, convert and compression encode the HDMI, AV, SDI or Ycbcr video signal thus outputting a serial differential signal, and transmit the serial differential signal to the image transmission unit over the differential signal transmission line. The digital video transmission component of the gimbal system may facilitate stable transmission of the video signal by virtue of an anti-interference characteristic of the serial differential signal.

DETAILED DESCRIPTION OF THE DISCLOSURE

Figure 1:
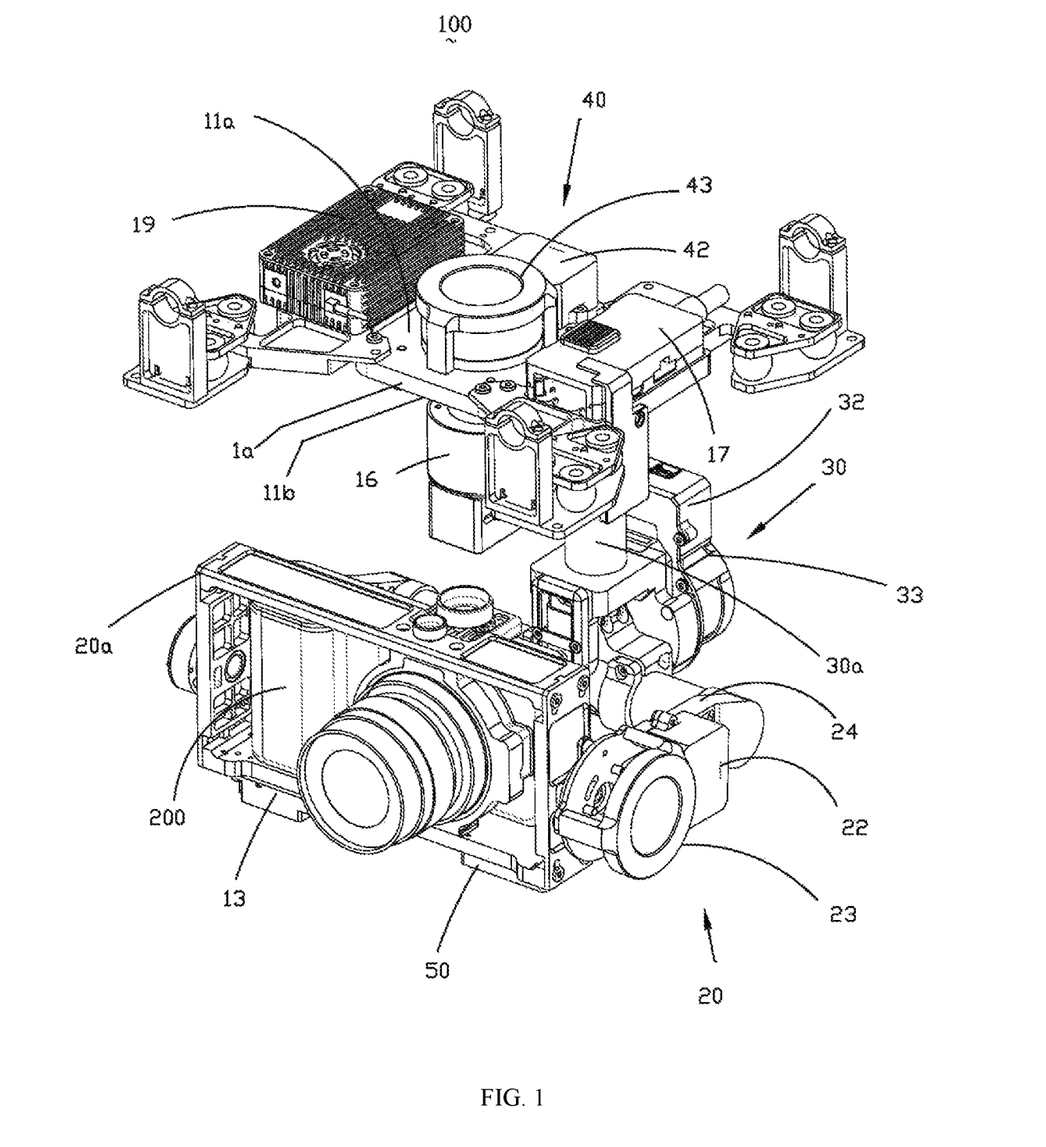
FIG. 1 is a schematic view of a gimbal system according to a first embodiment of the present disclosure.
Figure 2:
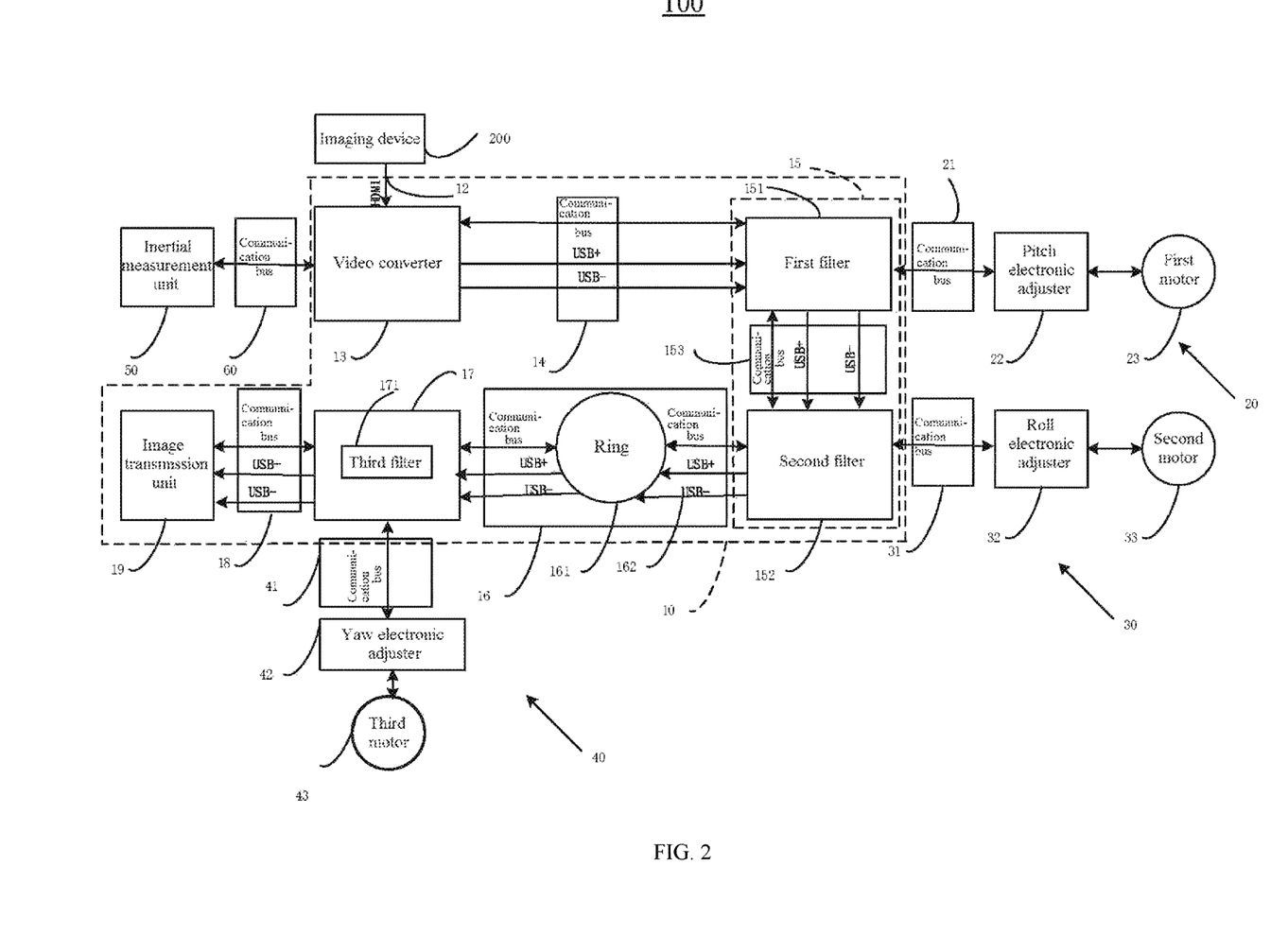
FIG. 2 is a general schematic diagram of the gimbal system according to the first embodiment of the present disclosure.

Referring to FIG. 1 and FIG. 2, a gimbal system 100 according to a first embodiment of the present disclosure may serve as an auxiliary device for photographing, imaging and monitoring, and may be applied in the fields of manned aircrafts, carriers, automobiles, ships, robots, movie producers, manually set devices and the like. The gimbal system 100 may include a holder 1a, a digital video transmission component 10, a first angle adjusting unit 20, a second angle adjusting unit 30, a third adjusting unit 40 and a main controller 50. The gimbal system 100 may carry an imaging device 200. The third angle adjusting unit 40 may be pivotally connected to the holder 1a. The second angle adjusting unit 30 may be connected to the third angle adjusting unit 40, and may rotate with respect to the third angle adjusting unit 40. The first angle adjusting unit 20 may be connected to the second angle adjusting unit 30, and may rotate with respect to the second angle adjusting unit 30, thus forming a three-axis gimbal.

In some embodiments, the holder 1a may include a top surface 11a and a bottom surface 11b which is opposite to the top surface 11a.

In some embodiments, the digital video transmission component 10 may include a data line 12, a video converter 13, a first differential signal transmission line 14, a first relay element 15, a transmission circuit 16, a gimbal control unit 17, a transmission line 18 and an image transmission unit 19. The transmission circuit 16 may be arranged on the bottom surface 11b. The gimbal control unit 17 and the image transmission unit 19 may be arranged on the top surface 11a.

In some embodiments, the data line 12 may receive a video signal taken by the imaging device 200, and transmit the video signal taken by the imaging device 200 to the video converter 13.

In some embodiments, the imaging device 200 may include an interface. In some instances, the video signal may be an HDMI video signal, and correspondingly the data line 12 may be an HDMI data line over which the HDMI video signal may be transmitted.

In some embodiments, the video converter 13 may also include a data interface which receives the HDMI video signal transmitted over the data line 12, converts and compression encodes the HDMI video signal, and outputs a serial differential signal. In some instances, the serial differential signal may be a USB serial differential signal.

As can be appreciated, the video signal output by the imaging device 200 may alternatively be an AV signal, an SDI signal or a Ycbcr signal. The video converter 13 may convert the AV signal, the SDI signal or the Ycbcr signal into a USB serial differential signal. A type of the data line 12 may correspond to a type of the video signal output by the imaging device 200. The serial differential signal may not be limited to a USB serial differential signal, but can alternatively be another type of serial differential signal.

In some instances, one end of the first differential signal transmission line 14 may be electrically connected to the video converter 13, and the other end of the first differential signal transmission line 14 may be electrically connected to the first relay element 15. In some embodiments, the first differential signal transmission line 14 may be a shielded twisted-pair including a communication bus, a USB+ line and a USB− line.

In some embodiments, a high bandwidth may be required for the HDMI video signal output by the imaging device 200. Therefore, the video converter 13 may convert and compression encode the HDMI video signal upon receiving the HDMI video signal. The bandwidth required for the output video signal may be lowered, that is, a bandwidth required for the gimbal system 100 may be lowered. Furthermore, a total number of signal lines may be lowered from 19 signal lines of the HDMI bus to 2 USB differential signal lines to facilitate a wiring in the gimbal system 100. With the present disclosure, a HDMI interface signal may be converted into a USB serial differential signal for transmission by virtue of an anti-interference characteristic of the differential signal, thus facilitating stable transmission of the video signal.

In some instances, the first relay element 15 may include a first filter 151, a second differential signal transmission line 153 and a second filter 152. The first filter 151 may be electronically connected to the first differential signal transmission line 14, and may also be electronically connected to the second filter 152 over the second differential signal transmission line 153 which may include a communication bus, a USB+ line and a USB− line.

In some embodiments, the transmission circuit 16 may include an electrical slip ring which is arranged between the holder 1a and the second angle adjusting unit 30. The electrical slip ring may include a ring 161 and a plurality of needle seats 162 which may include a communication bus pin, a USB+ pin and a USB− pin. The plurality of needle seats 162 may be in tight contact with the ring 161, thereby facilitate a stable transmission of the USB differential signal. The plurality of needle seats 162 may be electrically connected with the second filter 152.

In some embodiments, a third filter 171 may be integrated in the gimbal control unit 17. One end of the gimbal control unit 17 may be electrically connected with the transmission circuit 16. The gimbal control unit 17 may be electrically connected with the plurality of needle seats 162 of the transmission circuit 16 through a Flexible Printed Circuit Board (FPCB).

In some embodiments, the transmission line 18 may be a third differential signal transmission line. One end of the transmission line 18 may be electrically connected to the gimbal control unit 17, and the other end of the transmission line 18 may be electrically connected to the image transmission unit 19. The third differential signal transmission line may include a communication bus, a USB+ line and a USB− line. As can be appreciated, the transmission line 18 may alternatively be an optical fiber, a cable and the like.

In some instances, the first angle adjusting unit 20 may adjust a pitch angle of the imaging device 200. The first angle adjusting unit 20 may include a hollow carrier 20a, a first cable 21, a pitch electronic adjuster 22, a first motor 23 and a first shaft 24. The carrier 20a may carry the imaging device 200. The video converter 13 may be arranged on the carrier 20a. The first differential signal transmission line 14 and the data line 12 may be arranged in the carrier 20a. The first filter 151, the second filter 152 and the second differential signal transmission line 153 may be arranged in the first shaft 24. One end of the first cable 21 may be electrically connected to the first filter 151 of the first relay element 15, and the other end of the first cable 21 may be electrically connected to the pitch electronic adjuster 22. The first cable 21 may include a communication bus. The first motor 23 and the pitch electronic adjuster 22 may be arranged in the first shaft 24. The carrier 20a may be movably connected with the first shaft 24 through a rotating shaft of the first motor 23. The first motor 23 may be electrically connected to the pitch electronic adjuster 22. The pitch electronic adjuster 22 may control the rotation speed of the first motor 23 to adjust the pitch angle of the imaging device 200. Alternatively, the first cable 21 may be an optical fiber or a flexible circuit board.

In some instances, the second angle adjusting unit 30 may adjust a roll angle of the imaging device 200. The second angle adjusting unit 30 may include a second shaft 30a, a second cable 31, a roll electronic adjuster 32 and a second motor 33. The second shaft 30a may be substantially vertically connected with the first shaft 24. The second motor 33 and the roll electronic adjuster 32 may be arranged in the second shaft 30a. The second shaft 30a may be movably connected with the first shaft 24 through a rotating shaft of the second motor 33. One end of the second cable 31 may be electrically connected to the second filter 152 of the first relay element 15, and the other end of the second cable 31 may be electrically connected to the roll electronic adjuster 32. In some embodiments, the second cable 31 may include a communication bus. The second motor 33 may be electrically connected to the roll electronic adjuster 32. The roll electronic adjuster 32 may control the rotation speed of the second motor 33 to adjust the roll angle of the imaging device 200. Alternatively, the second cable 31 may be an optical fiber or a flexible circuit board.

In some instances, the third angle adjusting unit 40 may adjust a yaw angle of the imaging device 200. The third angle adjusting unit 40 may include a third cable 41, a yaw electronic adjuster 42 and a third motor 43. One end of the third cable 41 may be electrically connected to the gimbal control unit 17, and the other end of the third cable 41 may be electrically connected to the yaw electronic adjuster 42. In some embodiments, the third cable 41 may also include a communication bus. The third motor 43 may be electrically connected to the yaw electronic adjuster 42 and pivotally connected with the ring 161 of the transmission circuit 16. The yaw electronic adjuster 42 and the third motor 43 may be arranged on the top surface 11a of the holder 1a. The yaw electronic adjuster 42 may control the rotation speed of the third motor 43 to adjust the yaw angle of the imaging device 200. Alternatively, the third cable 41 may be an optical fiber or a flexible circuit board.

In some embodiments, the third motor 43 and the transmission circuit 16 may be arranged on the top surface 11a and the bottom surface 11b of the holder 1a, respectively. A rotating shaft of the third motor 43 may be pivotally connected with the ring 161 of the transmission circuit 16 which is electrically connected with the gimbal control unit 17. The gimbal control unit 17 may be electrically connected with the image transmission unit 19 over the transmission line 18. When the third motor 43 adjusts the yaw angle of the imaging device 100, the ring 161 of the transmission circuit 16 may rotate synchronously with the rotating shaft of the third motor 43, and the plurality of needle seats 162 may stay stationary with respect to the holder 1a. Therefore, the gimbal control unit 17 and other components (the first filter 151, the communication bus 21, the pitch electronic adjuster 22, the second differential signal transmission line 153, the second filter 152, the communication bus 31, the roll electronic adjuster 32, the third cable 41 and the yaw electronic adjuster 42) may be pivotally connected through the ring 161 of the transmission circuit 16 without such problem as twisted and restrained cables.

In some embodiments, the main controller 50 may be fixed on the carrier 20a. The main controller 50 may be electrically connected to the video converter 13 through a fourth cable 60. The main controller 50 may include a gyroscope and an accelerometer. In some instances, the main controller 50 may be configured to sense an attitude of the imaging device 200 and transmit operational data of the gyroscope and the accelerometer to the gimbal control unit 17 over the communication bus of the first differential signal transmission line 14, the first filter 151, the communication bus of the second differential signal transmission line 153, and the communication bus pin of the transmission circuit 16. The gimbal control unit 17 may control the first angle adjusting unit 20, the second angle adjusting unit 30 and the third angle adjusting unit 40 according to the attitude information of the imaging device 200. In some embodiments, a control signal from the gimbal control unit 17 may be transmitted to the yaw electronic adjuster 42 over the communication bus of the third cable 41. The yaw electronic adjuster 42 may control the rotation of the third motor 43 upon receiving the control signal. The control signal from the gimbal control unit 17 may be transmitted to the second filter 152 over the communication bus of the transmission circuit 16 and then to the roll electronic adjuster 32 over the communication bus of the second cable 31. The roll electronic adjuster 32 may control the rotation of the second motor 33 upon receiving the control signal. The control signal from the gimbal control unit 17 may be transmitted to the pitch electronic adjuster 22 over the communication bus of the transmission circuit 16, the second filter 152, the communication bus of the second signal transmission line 153, the first filter 151, and the communication bus of the second cable 31. The pitch electronic adjuster 22 may control the rotation of the first motor 23 upon receiving the control signal.

In some embodiments, the gimbal system 100 may be a three-axis gimbal system. A plurality of interfering signals may enter the gimbal system 100 through the first cable 21, the second cable 31 and the third cable 41, respectively. The plurality of interfering signals may be introduced by the first motor 23 and the pitch electronic adjuster 22, the second motor 33 and the roll electronic adjuster 32, the third motor 43 and the yaw electronic adjuster 42. Therefore, the USB differential signal of the video transmission may be interfered, and the video transmission may be interrupted due to the interference to the differential signal. In order to address such interfering signals, in some embodiments, the first filter 151 may filter out the interference introduced by the pitch electronic adjuster 22, and the second filter 152 and the third filter 171 may filter out the interference introduced by the roll electronic adjuster 32 and the yaw electronic adjuster 42, respectively. In some embodiments, the first filter 151, the second filter 152 and the third filter 171 may suppress the interfering signals of the first, second and third motors 23, 33 and 43 by means of common mode inductors, thereby preventing the interfering signals of the first, second and third motors 23, 33 and 43 from interfering with the video serial differential signal.

In some instances, the main controller 50 may detect the attitude information of the imaging device 200. The gimbal control unit 17 may control the first angle adjusting unit 20, the second angle adjusting unit 30 and the third angle adjusting unit 40 according to the attitude information of the imaging device 200.

Figure 3:
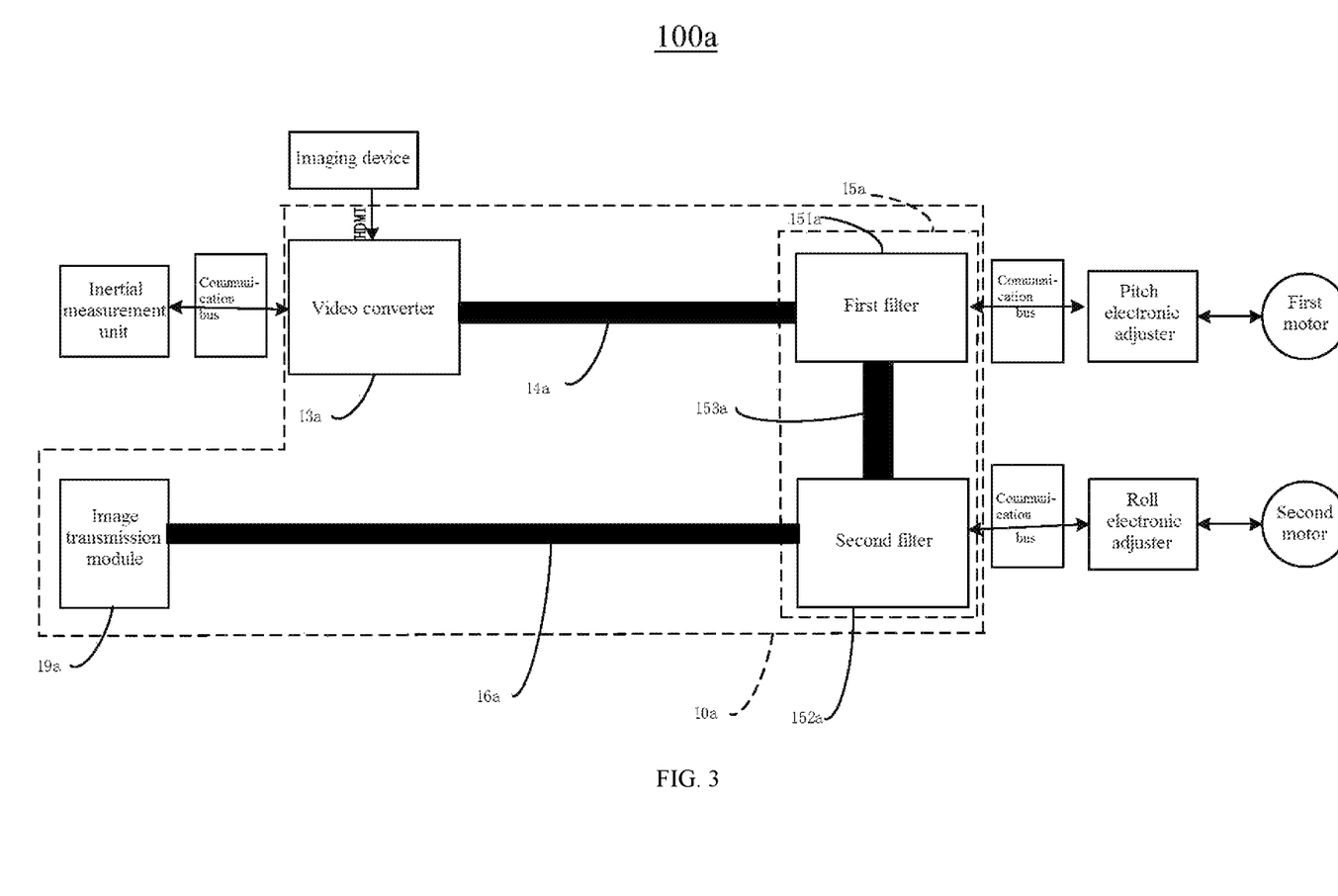
FIG. 3 is a general schematic diagram of the gimbal system according to a second embodiment of the present disclosure.

Referring to FIG. 3, a gimbal system 100a according to a second embodiment of the present disclosure may be a two-axis gimbal system which is substantially similar in structure to the gimbal system 100 according to the first embodiment, except that the third angle adjusting unit, the third filter and the transmission line are omitted, and the first differential signal transmission line 14a, the second differential signal transmission line 153a and the transmission circuit 16a are flexible circuit boards. In some instances, one end of the flexible circuit board of the transmission circuit 16a of the digital video transmission component 10a may be electrically connected to the second filter 152a, and the other end may be directly and electrically connected to the image transmission unit 19a. Alternatively, the first differential signal transmission line 14a, the second differential signal transmission line 153a and the transmission circuit 16a may be optical fibers.

Figure 4:
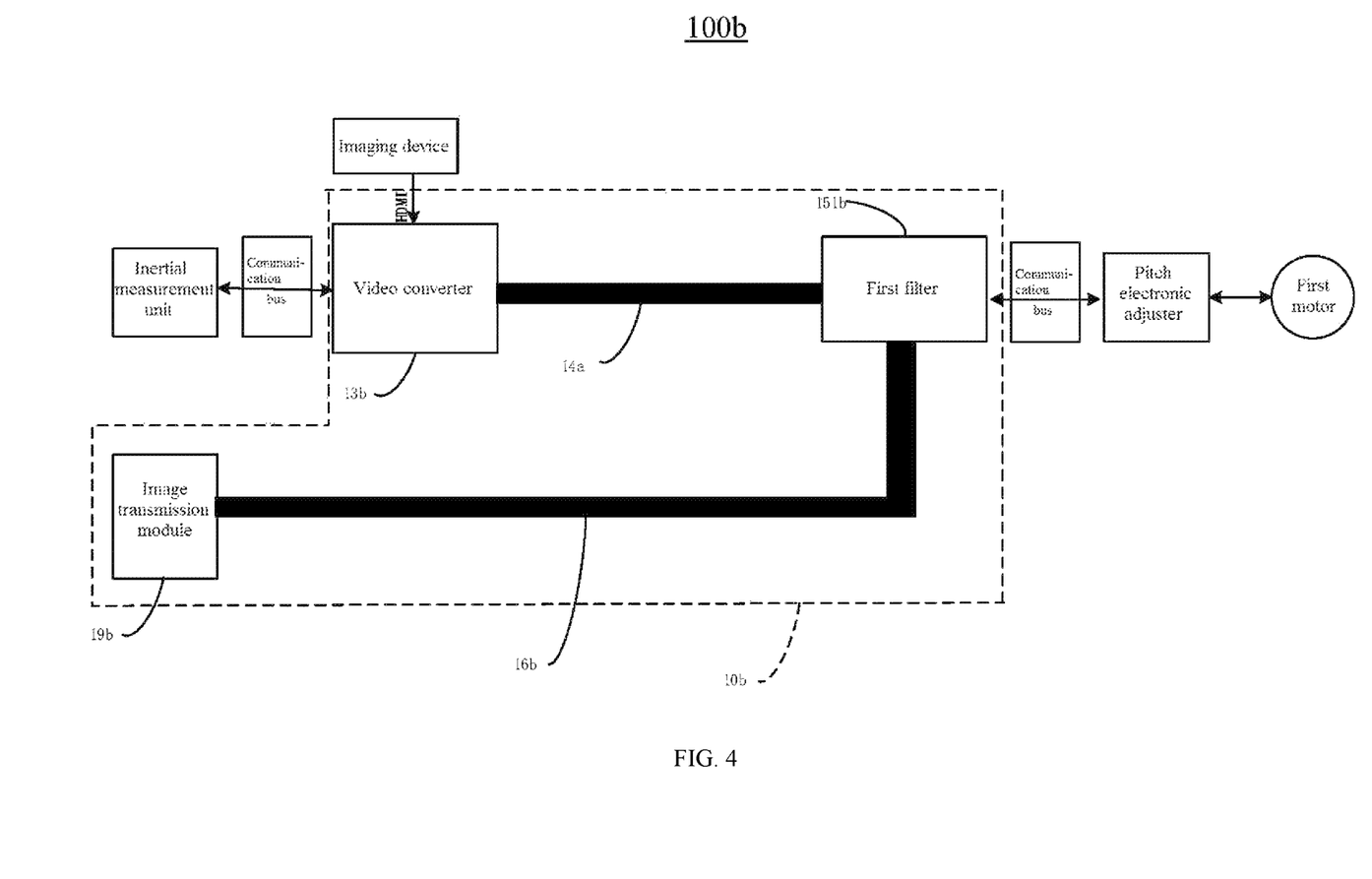
FIG. 4 is a general schematic diagram of the gimbal system according to a third embodiment of the present disclosure.

Referring to FIG. 4, a gimbal system 100b according to a third embodiment of the present disclosure may be a single-axis gimbal system, which is substantially similar in structure to the gimbal system 100 according to the first embodiment, except that the third angle adjusting unit, the third filter, the transmission line, the second angle adjusting unit, the second differential signal transmission line and the second filter are omitted, and the first differential signal transmission line 14b and the transmission circuit 16b are flexible circuit boards. In some embodiments, one end of the flexible circuit board of the transmission circuit 16b of the digital video transmission component 10b may be electrically connected directly to the first filter 151b, and the other end may be directly and electrically connected to the image transmission unit 19b. Alternatively, the first differential signal transmission line 14b, the second differential signal transmission line 153b and the transmission circuit 16b may be optical fibers.

In some embodiments, when the gimbal system 100b is a single-axis gimbal system, the single-axis gimbal system may alternatively be arranged with the second angle adjusting unit instead of the angle adjusting units, but will not be limited to the present embodiment.

The video converter may receive an HDMI, AV, SDI or Ycbcr video signal taken by the imaging device, convert and compression encode the HDMI, AV, SDI or Ycbcr video signal, output a serial differential signal, and transmit the serial differential signal to the image transmission unit over the first differential signal transmission line. The digital video transmission component of the gimbal system may facilitate a stable transmission of the video signal by virtue of an anti-interference characteristic of the serial differential signal.

The foregoing disclosure is merely illustrative of the embodiments of the disclosure but not intended to limit the scope of the disclosure. Any equivalent structural or equivalent flow changes, which are made without departing from the specification and the drawings of the disclosure, and an direct or indirect application in other relevant technical field, shall also fall into the scope of the disclosure.

What is claimed is:

1. A digital video transmitter comprising:
   a video converter configured to convert a digital video signal obtained from an imaging device to a serial differential signal;
   a filter electrically coupled to the video converter through a differential signal transmission line, and configured to filter an interference introduced by an electronic adjuster or a motor; and
   an image transmitter electrically coupled to the filter, and configured to receive and transmit the serial differential signal.

2. The digital video transmitter of claim 1, wherein the electronic adjuster is electrically coupled between the filter and the motor, and configured to control a rotation speed of the motor to adjust at least one of a pitch, roll, or yaw angle of the imaging device.

3. The digital video transmitter of claim 1, wherein:
   the differential signal transmission line is a first differential signal transmission line, the filter is a first filter, the interference is a first interference, the electronic adjuster is a first electronic adjuster, and the motor is a first motor; and
   the digital video transmitter further comprises:
   a second filter electrically coupled to the first filter through a second differential signal transmission line, and configured to filter a second interference introduced by a second electronic adjuster or a second motor.

4. The digital video transmitter of claim 3, wherein the second electronic adjuster is electrically coupled between the second filter and the second motor, and configured to control a rotation speed of the second motor to adjust at least one of a pitch, roll, or yaw angle of the imaging device.

5. The digital video transmitter of claim 3, further comprising:
a gimbal controller electrically coupled between the second filter and the image transmitter, wherein the gimbal controller is electrically coupled to the second filter through a transmission circuit and electrically coupled to the image transmitter through a third differential signal transmission line.

6. The digital video transmitter of claim 5, wherein the transmission circuit comprises an electrical slip ring, the electrical slip ring including a ring and a plurality of needle seats coupled to the ring, wherein the plurality of needle sets comprise a communication bus pin, a USB+ pin, and a USB− pin.

7. The digital video transmitter of claim 5, wherein at least one of the first differential signal transmission line, the second differential signal transmission line, or the third differential signal transmission line includes a communication bus, a USB+ line, and a USB− line.

8. The digital video transmitter of claim 5, wherein the gimbal controller comprises a third filter configured to filter a third interference introduced by a third electronic adjuster or a third motor.

9. The digital video transmitter of claim 8, wherein the third electronic adjuster is electrically coupled between the third filter and the third motor, and configured to control a rotation speed of the third motor to adjust at least one of a pitch, roll, or yaw angle of the imaging device.

10. The digital video transmitter of claim 8, wherein the third motor comprises a rotating shaft configured to be pivotally connected with a ring of the transmission circuit.

11. The digital video transmitter of claim 10, wherein the ring of the transmission circuit is configured to be rotated synchronously with the rotating shaft when the third electronic adjuster controls the rotation speed of the third motor.

12. The digital video transmitter of claim 1, further comprising:
a data line electrically coupled to the video converter and configured to receive the digital video signal from the imaging device and transmit the digital video signal to the video converter.

13. A gimbal system, comprising:
an angle adjusting assembly configured to carry an imaging device, the angle adjusting assembly including an electronic adjuster configured to control a rotation speed of a motor; and
a digital video transmitter configured to transmit a digital video signal obtained from the imaging device, the digital video transmitter including:
a filter electrically coupled to the electronic adjuster, and configured to filter an interference introduced by the electronic adjuster or the motor; and
an image transmitter electrically coupled to the filter through a transmission circuit.

14. The gimbal system of claim 13, further comprising:
a main controller configured to detect posture information of the imaging device;
wherein the digital video transmitter further includes:
a video converter configured to receive the digital video signal and convert the digital video signal to a serial differential signal, wherein the video converter is electrically coupled to the filter through a differential signal transmission line.

15. The gimbal system of claim 14, wherein:
the angle adjusting assembly is a first angle adjusting assembly, the electronic adjuster is a first electronic adjuster, and the motor is a first motor; and
the gimbal system further comprises:
a second angle adjusting assembly including a second electronic adjuster configured to control a rotation speed of a second motor.

16. The gimbal system of claim 15, wherein:
the differential signal transmission line is a first differential signal transmission line, the filter is a first filter, and the interference is a first interference;
the digital video transmitter further comprises:
a second filter electrically coupled to the first filter through a second differential signal transmission line, wherein the second filter is electrically coupled to the second electronic adjuster, and configured to filter a second interference introduced by the second electronic adjuster or the second motor.

17. The gimbal system of claim 16, further comprising:
a third angle adjusting assembly including a third electronic adjuster configured to control a rotation speed of a third motor;
wherein the digital video transmitter further includes a third filter electrically coupled to the second filter through the transmission circuit, wherein the third filter is electrically coupled to the third electronic adjuster, and configured to filter a third interference introduced by the third electronic adjuster of the third motor.

18. The gimbal system of claim 17, wherein:
the third motor comprises a rotating shaft configured to be pivotally connected with a ring of the transmission circuit, wherein the ring of the transmission circuit is configured to be rotated synchronously with the rotating shaft when the third electronic adjuster controls the rotation speed of the third motor.

19. The gimbal system of claim 17, wherein:
the first angle adjusting assembly further comprises:
a carrier configured to carry the imaging device; and
a shaft, the carrier being movably coupled to the shaft through a rotating shaft of the first motor;
the video converter and the main controller are arranged on the carrier;
the first differential signal transmission line is arranged in the carrier; and
the first filter is arranged within the shaft.

20. The gimbal system of claim 19, wherein:
the shaft is a first shaft;
the second angle adjusting assembly further includes a second shaft;
the second motor and the second electronic adjuster are arranged within the second shaft; and
the second shaft is movably coupled to the first shaft through a rotating shaft of the second motor.

* * * * *